United States Patent
Hisada et al.

[15] 3,680,579
[45] Aug. 1, 1972

[54] LIQUID LEVEL DETECTING APPARATUS

[72] Inventors: Takeo Hisada, Tokyo; Fumio Nakajima, Yokohama; Takeshi Nishi, Tokyo; Kunro Sugiyama, Fujisawa, all of Japan

[73] Assignee: Tokico Ltd., Kawasaki-shi, Kanagawa-ken, Japan

[22] Filed: Oct. 19, 1970

[21] Appl. No.: 81,922

[30] Foreign Application Priority Data

Oct. 29, 1969 Japan..........................44/86218
Oct. 29, 1969 Japan..........................44/86219
Oct. 29, 1969 Japan..........................44/86220
Oct. 29, 1969 Japan..........................44/86221

[52] U.S. Cl. ....................137/81.5, 73/302, 116/109
[51] Int. Cl. ............................................G01f 23/16
[58] Field of Search.........116/109; 73/302; 137/81.5

[56] References Cited

UNITED STATES PATENTS 3,277,914  10/1966  Manion.........................137/81.5
3,538,931  11/1970  Blosser et al..................137/81.5
3,331,380   7/1967  Schonfeld.....................137/81.5

Primary Examiner—Louis R. Prince
Assistant Examiner—Denis E. Corr
Attorney—Waters, Roditi, Schwartz & Nissen

[57] ABSTRACT

A liquid level detecting apparatus detects a level of the surface of the supplied liquid by use of a liquid level sensing and detecting means. The apparatus comprises a fluidic device which has its input controlled in response to the liquid surface level sensed by the liquid level sensing means and thereby changes its output. Issuance of alarm, stopping of liquid supply and the like operations are performed by changing over the output of the fluidic device.

6 Claims, 18 Drawing Figures

LIQUID LEVEL DETECTING APPARATUS

This invention relates to a liquid surface level detecting apparatus, and more particularly to an apparatus for detecting a liquid surface level reaching a predetermined value by use of a liquid level sensing and detecting means having a fluidic device or devices. The issuance of alarm, indication, or stopping of liquid supply are performed by the output of the liquid level sensing means when the liquid reaches the predetermined value.

In general, it is necessary to detect the surface level of the supplied liquid in order to supply a definite quantity of liquid into such a container as a tank or to avoid the overflow of the liquid from the container. Many apparatuses have heretofore been proposed for detecting the liquid level. An alarm or indication informing that the liquid level has reached at the predetermined level is provided by the level detecting signal. Further, the detecting signal may operate the liquid supplying apparatus for stopping the liquid supply.

In the conventional liquid level detecting apparatus, such operations as the liquid level detection, issuance of alarm, indication, stopping of liquid supply and the like have been usually effective by means of electrical signals. However, when the liquid having its level detected is an explosive or inflammable liquid as gasoline, the apparatus used for detecting the liquid level must have an explosive-proof construction. This sort of construction of the apparatus, however, requires a great deal of complexity and high cost.

To possibly lessen these disadvantages, there have been proposed liquid level detecting devices which can detect the liquid level and issue output signals which are converted into compressed air signals. The output of this liquid level detecting signal can be varied analogously. However, in the liquid level detecting of the back pressure type in which the back pressure of the liquid rises in proportion to rising of the liquid level, the treatment of the signal is very difficult. It is required therefore to provide a fixed air pressure apparatus such as a complicated pressure reducing valve for elevating the detecting accuracy. These are disadvantages of the known liquid level detecting apparatuses.

The general object of the present invention is therefore in providing a novel and useful liquid level detecting apparatus which eliminates the disadvantages of the known apparatuses as hereinabove described.

Another object of the invention is to provide a liquid level detecting apparatus which can obtain an output of the liquid level detection with a digital variation to attain the liquid level detecting at a high degree of accuracy.

A further object of the invention is to provide a liquid level detecting apparatus which can effect operations of liquid level detection, issuance of alarm, indication and stopping of liquid supply by fluidic signals such as of air. Thereby, the detecting of the liquid can be safely performed even though it is an explosive and inflammable liquid.

A still further object of the invention is to provide a liquid level detecting apparatus which is simply constructed at low cost by use of a detecting means employing fluidic devices.

These and other objects and features of the invention will become apparent from the description with reference to the accompanying drawings, in which.

Figure 1:
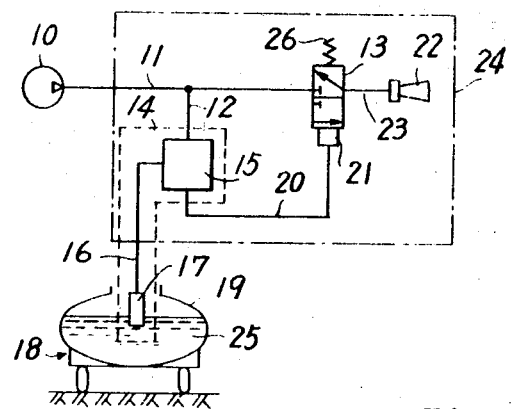
FIG. 1 is a schematic diagram of an embodiment of this invention.
Figure 4:
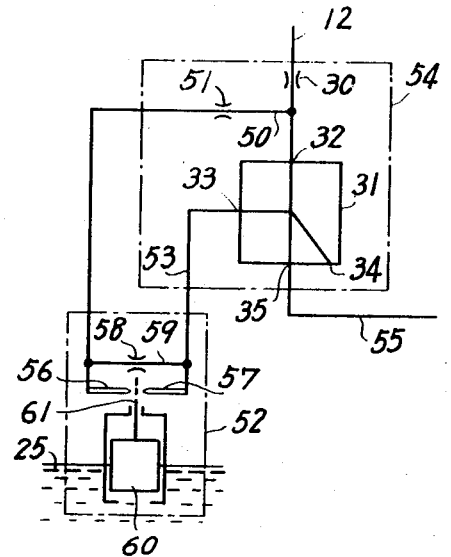
FIG. 4 is a diagram of a fluidic circuit system of another embodiment of the liquid level detecting part in the apparatus shown in FIG. 1.
Figure 5A:
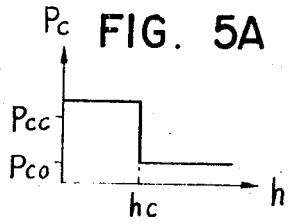
Figure 5B:
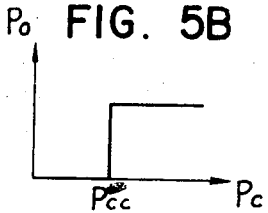
Figure 6:
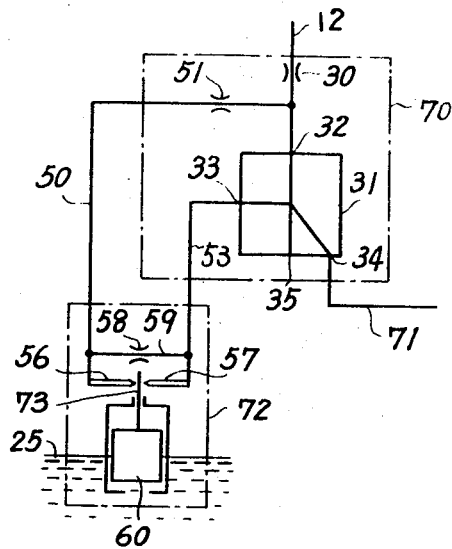
Figure 7:
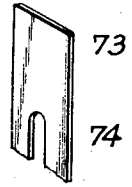
Figure 8A:
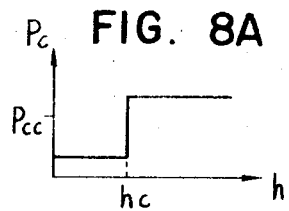
Figure 8B:
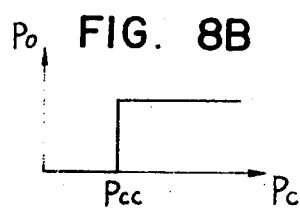
Figure 9:
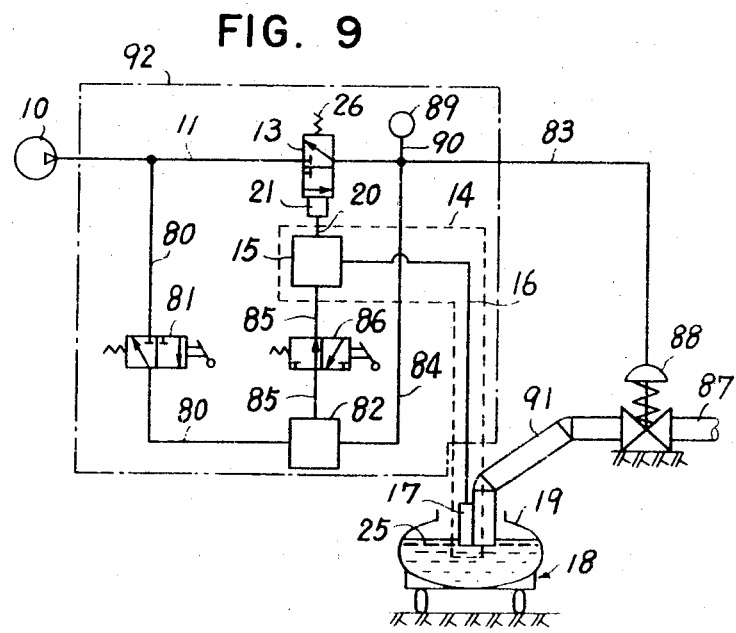
Figure 10:
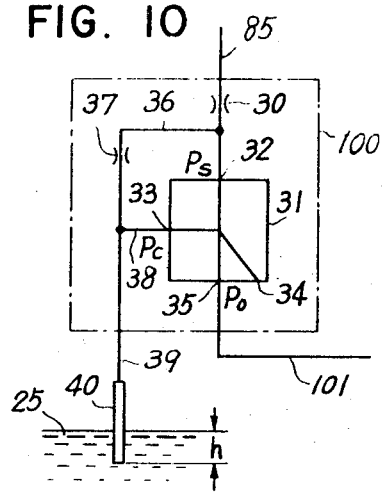
Figure 11:
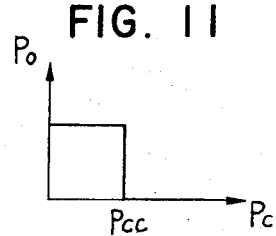
Figure 12:
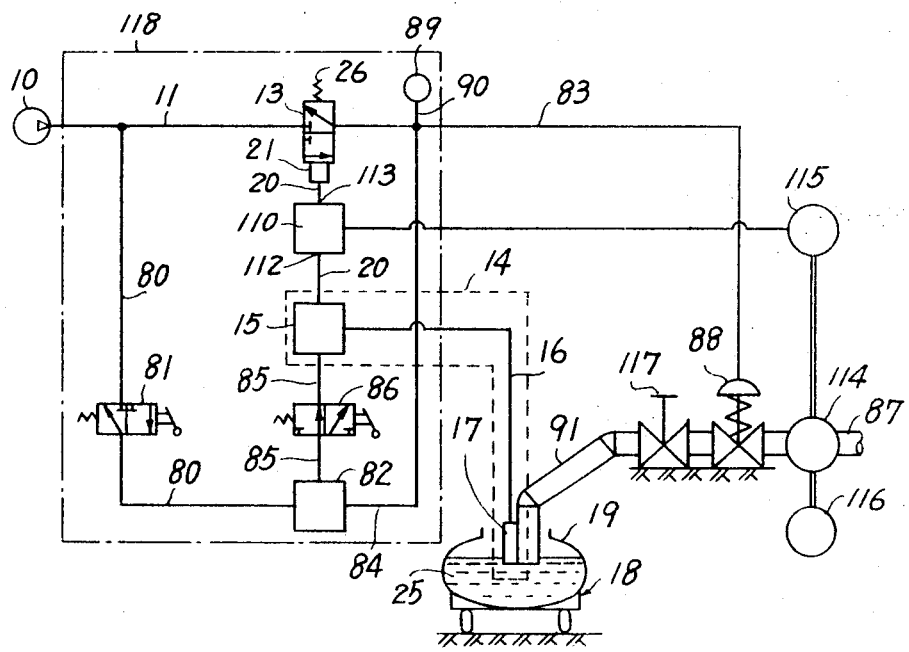
Figure 13:
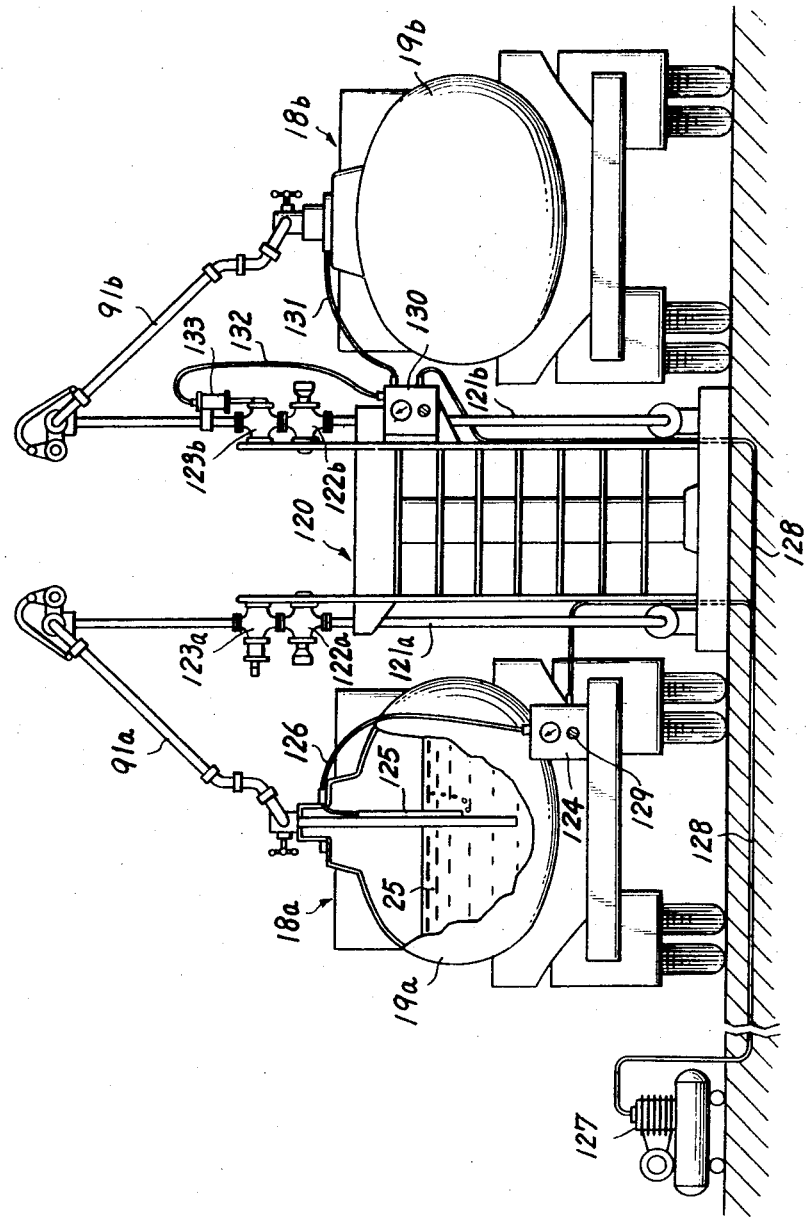
Figure 14:
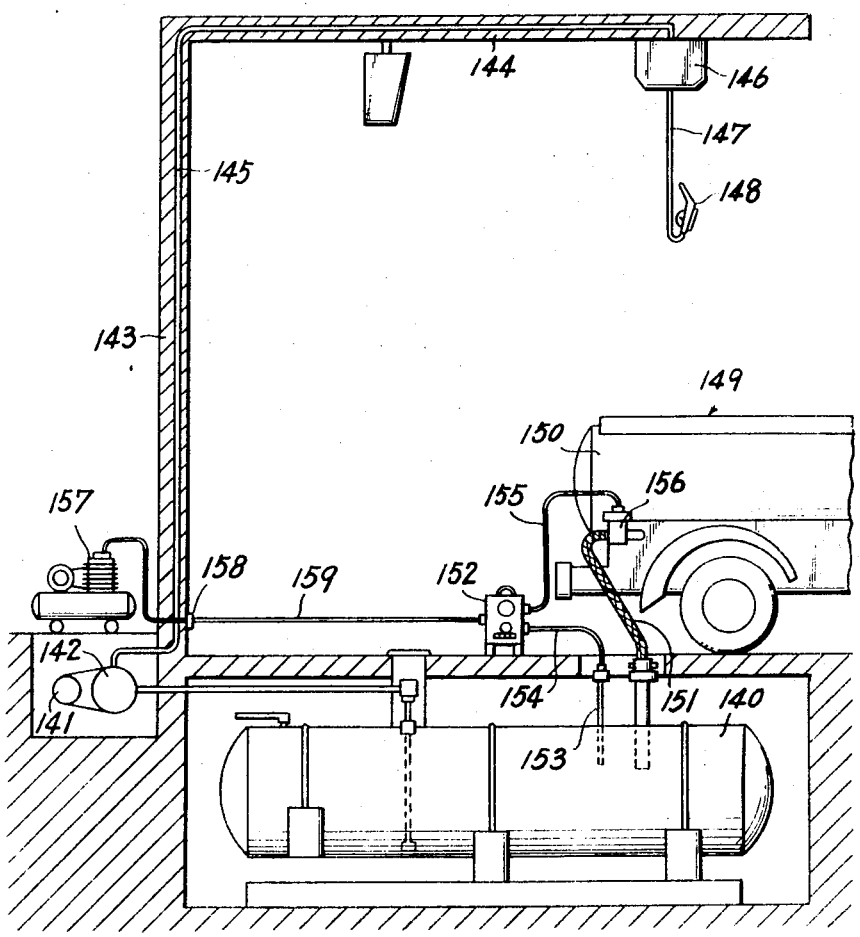

FIGS. 5A and 5B respectively show pressure characteristics at the liquid level detecting part shown in FIG. 4;

FIG. 6 is a diagram of a fluidic circuit system of still another embodiment of the liquid level detecting part in the apparatus shown in FIG. 1;

FIG. 7 is a perspective view of a part of a shield plate used in the detecting part of FIG. 6;

FIGS. 8A and 8B respectively show pressure characteristics at the liquid level detecting part of FIG. 6;

FIG. 9 is a schematic diagram of a second embodiment of the apparatus of the invention;

FIG. 10 is a diagram of a fluidic circuit system of an embodiment of the liquid level detecting part in the apparatus of FIG. 9;

FIG. 11 shows a pressure characteristic of the detecting signal of the fluidic circuit system of FIG. 10;

FIG. 12 is a schematic diagram of a third embodiment of the apparatus of the invention;

FIG. 13 is a side view showing two actual embodiments of the apparatus of the invention at the same time when applied in a fuel supplying equipment for a tank lorry; and FIG. 14 is a vertically sectioned side view showing an actual embodiment of the apparatus of the invention which is applied in a gasoline service station.

FIG. 1 is a diagrammatic view schematically showing a system of a first embodiment of the apparatus according to the present invention. Compressed air from a compressed air source 10 is supplied through an air supply pipe 11 to an air pilot spring-return type two-position and three-connection changeover valve 13 and through an air supply pipe 12 extending from the pipe 11 to a liquid level detecting part 14. The liquid level detecting part 14 comprises a signal amplifier changeover part 15, one or more air pipes 16 and a liquid level sensing part 17. The liquid level sensing part 17 is inserted into a tank 19 of a tank lorry 18.

A detecting signal issued from the liquid level detecting part 14 is supplied through an air pipe 20 to a pilot part 21 of the changeover valve 13. An air-type alarm 22 is connected through an air pipe 23 to the changeover valve 13. The aforementioned changeover valve 13, signal amplifier changeover part 15 and alarm 22 are contained in a control box 24.

Figure 2:
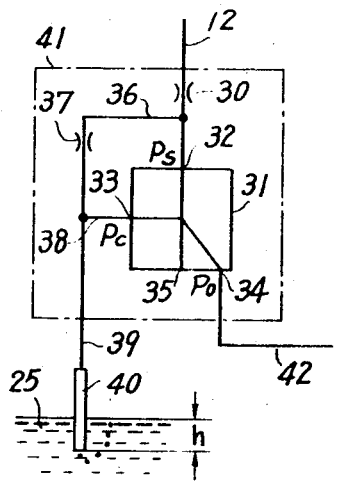
FIG. 2 is a diagram of a fluidic circuit system in an embodiment of a liquid level detecting part of the apparatus shown in FIG. 1.

An embodiment of the liquid level detecting part 14 is shown in FIG. 2. The air supply pipe 12 has a fixed throttle part 30 midway thereof and is connected to a supply port 32 of a pure fluidic digit amplifier device 31 in the signal amplifier changeover part 41 (designated at 15 in FIG. 1). An air pipe 36 extending from the output side of the throttle part 30 of the pipe 12 has midway thereof a fixed throttle part 37. The air from the pipe 36 on one hand is supplied through a pipe 38 to the input (control) port 33 of the device 31. The air from the pipe 36 on the other hand is supplied, through a pipe 39 corresponding to the pipe 16 in FIG. 1; to a level sensor 40 of the bubbler tube type corresponding to the liquid level sensing part 17 in FIG. 1.

Operations of the apparatus of the above described construction are now described. As the tank 19 is supplied with a liquid 25, the liquid surface level rises correspondingly. Before the level of the liquid 25 reaches a predetermined value, the changeover valve 13 is not yet communicated as shown in the figure. The compressed air from the air source 10 in the pipe 11 is intercepted by the changeover valve 13. The alarm 22 is opened to the air and is not operated. The compressed air supplied through the pipes 11, 12, 36 and 39 is discharged from an exhaust port provided at the end of the tube of the level sensor 40.

Figure 3A:
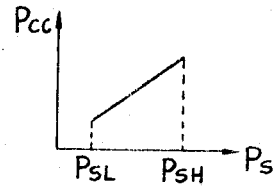
FIGS. 3A to 3C show pressure characteristics at the liquid level detecting part shown in FIG. 2.
Figure 3B:
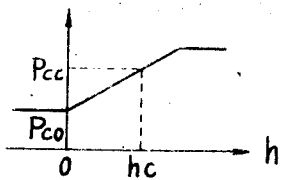
Figure 3C:
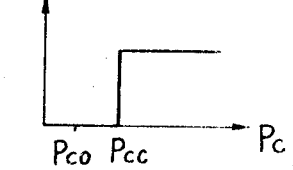

While the liquid level is low and the level sensor 40 is not yet dipped into the liquid 25, an air pressure Pc of the input port 33 of the device 31 is at a pressure Pco as shown in FIG. 3B. Accordingly, the air supplied to the supply port 32 is discharged into atmosphere from an output port 35. Thus, an output pressure Po of an output port 34 is maintained at zero as shown in FIG. 3C. The throttle part 30 is provided to set up a supply port pressure Ps so that the device 31 may come within an adequate range of operation. As shown in FIG. 3A, the supply port pressure Ps is set up so as to come within an adequate operational range between an upper limit $Ps_H$ and a lower limit $Ps_L$. A critical value Pcc of the input port pressure Pc must be a value such as that corresponding to the full line as shown in FIG. 3A according to the pressure Ps. This input port pressure Pc is set up by the throttle part 37.

As the supply of liquid 25 advances and the liquid level rises so as to make the level sensor 40 dip into the liquid 25, the air is not easily discharged from the level sensor 40 by the head pressure of the liquid responsive to the head height $h$ of liquid in which the sensor is dipped. Thus, the pressure Pc of the input port 33 increases in response to the head height $h$ as shown in FIG. 3B. When the head height $h$ of the liquid reaches a critical value hc, the head pressure of the liquid and the air pressure in the level sensor 40 become equal and the air is not exhausted from the level sensor 40. At this instant, the input port pressure Pc reaches a critical value Pcc. As the input port pressure reaches Pcc, the output of the air supplied to the supply port 32 of the device 31 is instantly changed from the output port 35 to the output port 34. The pressure Po of the output port 34 can be digitally obtained with an increase of a rectangular waveform as shown in FIG. 3C.

In this embodiment, the supply port pressure Ps and the critical input port pressure Pcc have a relationship which is expressed by the formula $Pcc = 1/10 Ps$. Also, the supply port pressure Ps and the output port pressure Po have a relationship of $Po = 3/10 Ps$. Accordingly, the relationship of the pressure Po and the pressure Pcc can be shown by $Po = 3 Pcc$. Thus, in the fluidic digital amplifier device 31, the input pressure is taken out as an output pressure amplified three times.

The air pressure signal of the pressure Po which is taken out from the output port 34 of the amplifier device 31, as the liquid level sensing signal, passes through a pipe 42 (designated at 20 in FIG. 1) and supplied to the pilot part 21 of the changeover valve 13. This switches the changeover valve 13 downwards against the force of a spring 26 as shown in FIG. 1. Since, in this manner, the changeover valve 13 is changed from a state of non-communication to a state of communication, the compressed air from the air source 10 in the pipe 11 passes, through the changeover valve 13 and pipe 23, to the alarm 22. The alarm 22 thereby generates sounds, for example, of 100 phon loudness warning that the level of the liquid 25 has reached a height as predetermined.

The alarm 22 may not be confined to those providing alarm sounds but it may broadly include other informing means such as indicators actuated by the compressed air. According to this embodiment, the alarm 22 is directly operated by the air supplied from the air source 10 through the pipe, although it may indirectly operated through other means. The compressed air source for supplying the compressed air to the liquid level detecting part 14 can be separately designed from the compressed air source for supplying the compressed air to the alarm 22.

Another embodiment of the liquid level detecting part 14 is shown in FIG. 4. In FIGS. 2 and 4, identical parts being denoted by the same numerals. An air pipe 50 extending from the output side of the throttle part 30 in the pipe 12 has therein a fixed throttle part 51 and extends to a level sensor 52 (designated at 17 in FIG. 1). An air pipe 53 extended from the level senser 52 is connected to the input port 33 of the fluidic digital amplifier device 31. The output port 35 of the device 31 is connected through a pipe 55 (designated at 20 in FIG. 1) to the pilot 21 of the changeover valve 13. The output port 34 of the device 31 is opened to the atmosphere.

There are provided in the level senser 52 a first nozzle 56 connected to the pipe 50 and a second nozzle 57 connected to a pipe 53 with their injection ports positioned oppositely each other. The pipe 50 and the pipe 53 are connected by a pipe 59 having in the way a throttle part 58. A float 60 floating on the liquid 25 is provided with a shield plate 61 at its upper portion for shielding and interrupting between the nozzle 56 and 57.

Before the level of the liquid 25 supplied in the tank 19 reaches a predetermined level, the shield plate 61 does not come to a position so as to shield between the nozzles 56 and 57. The air to be discharged from the nozzle 57 passes through the throttle part 58 and is lower in pressure than the compressed air on the nozzle 56 side. The exhaust air port at the end of the nozzle 57 is affected by the pressure of jetting air injected from the nozzle 56. Therefore, the nozzle 57 does not exhaust the air, nor can it easily exhaust the air. Thus, the air in the pipe 59 reduced in pressure at the throttle part 58 is completely or nearly completely supplied to the input port 33 of the device 31 through the pipe 53.

Herein, the input pressure Pc of the input port 33 is set up at the throttle part 58 so that it can be equal to or higher than the changeover operation critical pressure Pcc of the device 31. Then, the compressed air supplied to the supply port 32 through the pipe 12 is discharged from the output port 34 into the air. The output pressure Po of the output port 35 is at zero.

As the supply of the liquid 25 advances, the float 60 rises. If the head height $h$ of the liquid level has been raised to the fixed level hc, the upper portion of the shield plate 61 provided at the float 60 shields between the nozzles 56 and 57. When the nozzles 56 and 57 are shielded therebetween, the nozzle 57 is opened by the jetting air injected from the nozzle 56 and injects the air freely. Then, the pressure of air in the pipe 53 is lowered. The pressure Pc of the input port 33 of the device 31 reduces to a pressure Pco lower than the critical pressure Pcc as shown in FIG. 5A. When the input port pressure Pc turns to the pressure Pco, at the instant the pressure Pc becomes lower than the pressure Pcc, the output of the device 31 is changed over instantly from the output port 34 to the output port 35. The output pressure Po of the output port 35 is obtained digitally with an increase as shown in FIG. 5B. The output of the output port 35 is supplied to the pilot part 21 of the changeover valve 13 through the pipe 55, and then the changeover valve 13 is changed in the similar way as shown in the above described embodiment.

Still another embodiment of the liquid level detecting part 14 is shown in FIG. 6. Throughout FIGS. 2, 4 and 6, identical parts are denoted by the same numerals. In the signal amplifier changeover part 70 (designated at 15 in FIG. 1), the output port 34 of the fluidic digital amplifier device 31 is connected with a pipe 71. The output port 35 is opened to the atmosphere.

In a level sensor 72 (designated at 17 in FIG. 1), a shield plate 73 is attached to the upper portion of the float 60. The shield plate 73 has a groove 74 at the lower part as shown in FIG. 7. Before the liquid 25 reaches a predetermined level, the shield plate 73 shields between the nozzles 56 and 57 by its upper portion. The pressure Pc of the input port 33 is lower than the critical pressure Pcc as shown in FIG. 8A. The compressed air supplied to the supply port 32 is discharged from the output port 35 to the atmosphere. The output pressure Po of the output port 34 is at zero.

By advance of liquid supply and with the head height h of the liquid 25 reaching to a predetermined level hc, the groove 74 of shield plate 73 is positioned between the nozzles 56 and 57. At this instant, the nozzle 57 receives the air jet injected from the nozzle 56 so that the input port pressure Pc increases over the critical pressure Pcc as shown in FIG. 8A. Consequently, the output pressure Po of the output port 34 is supplied through the pipe 71 to the pilot part 21 of the changeover valve 13 with the digital rising as shown in FIG. 8B.

A second embodiment of the apparatus according to the present invention is illustrated in FIG. 9. The compressed air from the air source 10 is supplied through the air pipe 11 to the two-position three-connection air changeover valve 13 of the air pilot spring return type and also supplied through an air pipe 80 diverged from the pipe 11 to a starting manual operation changeover valve 81. The output side of the manual operation changeover valve 81 is further connected through the pipe 80 to an OR gate 82 including for example shuttle valve. The OR gate 82 is connected also with an air pipe 84 diverged from an air pipe 83 on the output side of the changeover valve 13. The output side of the OR gate 82 is connected, through an air pipe 85, to emergency stop manually-operated changeover valve 86 and pipe 85, to the signal amplifier changeover part 15 of the liquid level detecting part 14.

A liquid supply pipe 87 connected to a reservoir (not shown) is provided with an air type liquid supply operating valve 88. A ball valve, poppet valve, diaphragm valve or the like operable by a cylinder or diaphragm may be used as the operating valve 88. The operating valve 88 is a normally closed valve which opens while its actuator is supplied with compressed air. The air pipe 83 on the output side of the changeover valve 13 is connected to the actuator of the operating valve 88. An indicator 89 is connected to an air pipe 90 diverged from the pipe 83. The liquid passed through the operating valve 88 is supplied into the tank 19 by a loading arm 91. The above mentioned changeover valves 13, 81 and 86, OR gate 82, signal amplifier changeover part 15 and indicator 89 are contained in a control box 92.

An embodiment of the liquid level detecting part 14 used in the apparatus shown in FIG. 9 is illustrated in FIG. 10. The liquid level detecting part of FIG. 10 is of the similar construction as that of FIG. 2. In the figure, identical parts are denoted by the same numerals, the illustration thereof being therefore omitted. The only difference resides in that an air pipe 101 (designated at 20 in FIG. 9) is connected to the output port 35 of the fluidic digital amplifier device 31 of a signal amplifier changeover part 100 (designated at 15 in FIG. 19). The output port 34 is opened to the atmosphere. The fluidic device 31 actuates as a NOT device in which when a predetermined input pressure is not present in the input port 33 an output is present in the output port 35 and when a predetermined input pressure is in the input port 33 and the output does not appear in the output port 35.

Operation of the apparatus of the above construction is now described below. Before starting of operation, the changeover valves 13 and 81 in the apparatus are not in a communicated state while the changeover valve 86 is in a communicated state. At the start of operation of the apparatus, the manual operation changeover valve 81 is changed to be communicated. As the changeover valve 81 is changed, the pressure air supplied from the pipe 80 is supplied, through the OR gate 82, pipe 85 and changeover valve 86, to the supply port 32 of the device 31.

As illustrated in reference to FIGS. 2 and 3, before starting of the liquid supply, the air pressure Pc of the input port 33 is at Pco which is below the critical value Pcc. Therefore, the compressed air supplied to the supply port 32 from the pipe 85 is taken out as an output from the output port 35 and supplied through the pipe 101 to the pilot part 21 of the changeover valve 13. Then, the changeover valve 13 is changed to be communicated. The compressed air from the pipe 11 is supplied, through the changeover valve 13 and pipe 83, to a liquid supply operating valve 88 which is then opened. The liquid is thereby started to flow through the pipe 87 and loading arm 91.

With the changeover valve 13 being communicated and the pipe 83 passed with compressed air, a part of the compressed air passes through the pipe 84 and is supplied to the OR gate 82. There is thus formed a closed loop including the changeover valve 13–pipe 83–pipe 84–OR gate 82–pipe 85–changeover valve 86–signal amplifier changing part 15–pipe 20–pilot part 21 of the changeover valve 13. Therefore, if the manual operation changeover valve 81 is automatically returned to its non-communicated condition after operation, the changeover valve 13 is self-held in its communicated condition. The indicator 89 operates when it is supplied compressed air through the pipes 83 and 90. The indicator 90 indicates the opening of the operating valve 88.

With the progress of liquid supply and reaching of the head height h of the liquid 25 to the critical value hc, the pressure Pc of the input port 33 attains the critical value Pcc. At this instant, the output of the device 31 is changed from the output port 35 to the output port 34. The output pressure Po of the output port 35 is digitally changed to zero as shown in FIG. 11. As the output of the port 35 is at zero, the pilot part 21 of the changeover valve 13 is not supplied air pressure. The changeover valve 13 returns to its initial condition as shown in FIG. 9 and intercepts the communication of the pipes 11 and 83. Therefore, the liquid supply operating valve 88 is not supplied the compressed air but closed to stop the liquid supply. At the same time, the indicator 89 is not supplied the compressed air and indicates the closing of the operating valve 88.

During the liquid supply operation as above described, the liquid supply is sometimes required to be stopped in emergency. Then, an emergency stop manual operation changeover valve 86 may be operated to take a non-communicated condition. By this operation, the pipe 85 is interrupted and the pressure air is not supplied to the pilot part 21 so that the changeover valve 13 returns to a non-communicating condition. In the similar way, the operating valve 88 is closed. The liquid supply is urgently stopped so as to meet the emergency.

For the liquid level detecting part 14 of the above embodiment as shown in FIG. 9, the detecting part as described in reference to FIGS. 4 and 6 can be employed. When the liquid level detecting part of FIG. 4 is employed, the air pipe extending to the pilot part 21 of the changeover valve 13 is connected to the output port 34 of the device 31. Also, when the liquid level detecting part of FIG. 6 is employed, the air pipe extending to the pilot part 21 of the changeover valve 13 and is connected to the output port 35 of the device 31.

A third embodiment of the apparatus according to the present invention is shown in FIG. 12. In FIGS. 9 and 12, identical parts are denoted by the same numerals, the illustration thereof being therefore omitted.

A NOT device 110 is provided in the way of the air pipe 20 extending from the signal amplifier changeover part 15 to the pilot part 21 of the changeover valve 13. The NOT device consists of a pure fluidic device. When no input signal is present in an input port 111 of the device 110, the compressed air supplied from the pipe 20 to a supply port 112 is taken out as an output from an output port 113. When the input signal is present in the input port 111, output does not appear in the output port 113.

There is provided a flowmeter 114 in the liquid pipe 87. The NOT quantity of liquid is delivered to a fixed quantity signal emission mechanism 115 and a printer 116. The fixed quantity signal emission mechanism 115 sends a fixed quantity air signal to the not device 110 when the flow quantity of the liquid measured by the flowmeter 114 and passed through the pipe 87 reaches a predetermined quantity. The fixed quantity signal emission mechanism 115 may have its own air source or use the air from the air source 10. The above-mentioned changeover valves 13, 81 and 86, OR gate 82 signal amplifier changeover part 15, NOT device 110, and indicator 89 are all contained in a control box 118. A manual operation valve 117 is provided for stopping the liquid supply manually upon emergency when the air operating valve 88 has some troubles.

Similarly as in the above embodiment, the liquid supply operation is started. Before the liquid surface level of the liquid 25 reaches a predetermined level so as to operate the liquid level detecting part 14, when the liquid quantity may reach a fixed value as previously set up, the fixed quantity signal emission mechanism 115 sends an air signal to the NOT device 110. Output is not appeard at the output port 113 of the NOT device 110. The changeover valve 113 is changed. The operating valve 88 is closed and the liquid supply is stopped. The quantity of the supplied liquid is printed on a bill by the printer 116.

If some previous liquid remains previously in the tank 19, the level of the liquid in the tank 19 sometimes reaches a fixed critical level before the quantity of liquid supply reaches a fixed value. Similarly, in case a trouble occurs in the system of the fixed quantity signal emission mechanism 115, the liquid level would reach a critical level. At this instant, the level sensor 17 of the liquid level detecting part 14 detects the liquid level reaching a critical level and stops the liquid supply by operation similar to the above described embodiments. Consequently, the overflow of the liquid 25 can be avoided for the tank 19.

In the above second and third embodiments, the operating valve 88 is a normally-closed valve to open while the compressed air is being supplied. However, this operating valve 88 may be a normally opened valve to close when the compressed air is supplied. In this event, other open-close valve is provided in the fuel supply pipe 87 and the operating valve 88 may be used exclusively as a stop valve. Also, in this case, the changeover valve 13 remains in a non-communicating condition during the liquid supplying operation. The detecting parts as shown in FIGS. 2, 4 and 6 may be used as the liquid level detecting part 14.

As embodiments of the control boxes 24, 92 and 118 may be fixedly provided on the side of the liquid supply equipment or on the side of the container for receiving the liquid supply such as a tank lorry, or otherwise constructed in a portable type. The air source 10 may be provided at the container side such as tank lorry or constructed in the portable type. The embodiments of the control boxes and air sources may desirably formed in suitable combinations.

FIG. 13 shows two actual embodiments in which the apparatus of this invention has been applied in a fuel supplying equipment for tank lorries.

The drawing shows that a tank lorry 18a is stationed on the left side of a liquid supply stage 120 and an end of a loading arm 91a has been inserted into a tank 19a of the tank lorry 18a. A liquid conveyed from a fixed reservoir is supplied in the tank 19a through a pipe 121a, flowmeter 122a, liquid supply operating valve 123a and loading arm 91a. A control box 124 containing the signal amplifier changeover part of the liquid level sensing part according to this invention is fixed at the tank lorry 18a. A level senser 125 inserted into the tank 19a and the control box 124 are connected by an air pipe 126. The control box 124 is supplied with compressed air through a flexible air pipe 128 from an air compressor 127. As the supply of the liquid 25 advances and the level senser 125 detects the liquid level being reached as predetermined, an alarm 129 of the control box 124 sounds by similar operation as hereinabove described.

In a tank 19b of the tank lorry 18b stationed on the right side of the liquid supplying stage 120 there is, as shown in the figure, inserted an end of a loading arm 91b and a level sensor. A control box 130 which contains a signal amplifier changeover part of a liquid level detecting part is provided in the way of a fixed liquid supply pipe 121b. The control box 130 and the level senser in the tank 19b are connected by a flexible air pipe 131. The control box 130 and an operating part 133 of an operating valve 123b are connected by an air pipe 132. When the level senser detects that the level of the supplied liquid has reached a predetermined level of liquid, the operating valve 123b is closed.

Throughout these embodiments, the compressed air source to the control boxes 124 and 130 is applied the compressor 127. The compressed air however may be supplied from an air tank for air braking, if the air tank is provided in the tank lorry.

FIG. 14 shows a practical embodiment of the apparatus of this invention which is used in a gasoline filling service station.

A gasoline reservoir 140 is provided in the underground of the service area of a fuel supplying station. In normal fuel supplying operation, gasoline is suctioned from the reservoir tank 140 by a pump 142 which is driven by a motor 141. The suctioned gasoline passes through a fixed pipe 145 provided in walls 143 and the ceiling 144 and runs to a delivery unit 146. During the fuel supplying operation, a flexible pipe 147 is pulled down from the delivery unit 146. Fuel supply is made from a nozzle 148 provided at the end of the delivery unit.

Upon supplying fuel to the reservoir tank 140 of the fuel supplying station, it is usual to supply fuel from the tank 150 of the tank lorry 149 filled with gasoline by means of a hose 151. A control box 152 containing the signal amplifier changeover part of the liquid level detecting part according to this invention has a construction designed in a portable type which is desirably carried about. The tank 140 is inserted with a level sensor 153 which can be adjusted of its height. The control box 152 and the level sensor 153 are connected by a rubber hose 154. Also, the control box 152 is connected to a liquid supply operating valve 156 by a rubber hose 155. On the backside of the walls 143 is placed a compressor 157. For supplying compressed air of the compressor 157, a coupling port 158 is provided at a front surface of the walls 143. The coupling port 158 and the control box 152 are connected by a rubber hose 159. The control box 152 is supplied compressed air form the compressor 157. When the level sensor 153 detects that the liquid level has reached the predetermined level, the operating valve 156 is closed and the fuel supply to the tank 140 is stopped. Instead of or at the same time as the operation of stopping the liquid supply, there may be provided a construction which allows the alarm on the control box 152 to sound.

In the embodiments shown in the above, the device 31 may consist of a pure fluidic device which may otherwise be a moving type fluidic device or amplifier.

What we claim is:

1. A liquid level detecting apparatus comprising a compressed air source; a fluidic device having a supply port supplied with compressed air from the compressed air source, an input port and output port; a liquid level sensing means, said sensing means being supplied with compressed air from said compressed air source and providing a pressure controlled by the exhaustion of said compressed air to the atmosphere responsive to the level of the liquid, the liquid level dependent pressure in said sensing means being supplied to the input port of the fluidic device; an air-operated changeover valve which is changed over by variation of output of the fluidic device; and an operating means variable in its condition by the changing of output of the fluidic device, wherein said output of the output port of the fluidic device is changed over by the input air pressure supplied to the input port, and said operating means is supplied with the compressed air from the compressed air source through the changeover valve.

2. The apparatus of claim 1, in which said liquid level sensing means comprises a first nozzle supplied with the compressed air from the compressed air source and jetting the air into the atmosphere, a second nozzle connected to the input port of the fluidic device and having its jetting port opposite to the first nozzle, an air pipe communicating between the first and second nozzles through a pressure reducing valve, and a shield plate floating on the liquid and movable upwardly and downwardly responsive to the liquid level, said shield plate being capable of locating between the first and second nozzles, said input port receiving the input from the air pipe when the shield plate is not located between the first and second nozzles but not receiving the input when the shield plate is located between the first and second nozzles.

3. The apparatus of claim 1, which further comprises an OR gate means communicating with the compressed air source side and the output side of the changeover valve and producing an output when the compressed air is present at least in either one of the compressed air source side or the output side of the changeover valve, wherein said operating means is a liquid supply operating valve provided in a liquid supply pipe to open while it receives the compressed air, said changeover valve being provided between the compressed air source and the operating valve, said output of the fluidic device is changed over so as to change the changeover valve to non-communicating condition when the liquid level sensing means senses a liquid level as predetermined, said OR gate means making self-holding of communication of the changeover valve.

4. The apparatus of claim 3, which further comprises a flowmeter provided in the liquid supply pipe, a fixed quantity signal emission means cooperating with the flowmeter and emitting a fixed quantity air signal when the flow quantity reaches a predetermined quantity and a NOT device being interposed between the output side of the fluidic device and the changeover valve and performing a NOT operation by the signal from the fixed quantity signal emission means.

5. The apparatus of claim 1 in which said operating means is an alarm means operated by the compressed air from the compressed air source through the changeover valve, and said output of the fluidic device is changed over to changeover the air-operated changeover valve so that the alarm means is operated by the compressed air when the liquid level sensing means detects a predetermined liquid level.

6. The apparatus of claim 1 in which said operating means is an open-close valve provided in a liquid supply pipe and operated by the the compressed air from the compressed air source through the changeover valve, and said output of the fluidic device is changed over to change over the air-operated changeover valve so that the open-close valve is closed by the compressed air when the liquid level sensing means detects a predetermined liquid level.

* * * * *